United States Patent [19]

Komatsu et al.

[11] 4,003,976

[45] Jan. 18, 1977

[54] CONVERTER FOR THE PURIFICATION OF EXHAUST GASES

[75] Inventors: Noboru Komatsu, Toyoake; Osami Kamigaito, Nagoya; Takatoshi Suzuki, Nagoya; Nobuyuki Yamamoto, Nagoya; Haruo Doi, Nagoya; Kazuya Sano, Nagoya; Toshio Kandori, Nagoya; Yukikazu Tsuzuki, Nagoya, all of Japan

[73] Assignee: Kabushiki Kaisha Toyota Chuo Kenkyusho, Japan

[22] Filed: Aug. 29, 1975

[21] Appl. No.: 608,912

Related U.S. Application Data

[63] Continuation of Ser. No. 455,909, March 28, 1974, abandoned.

[30] Foreign Application Priority Data

Apr. 3, 1973  Japan .................... 48-37427

[52] U.S. Cl. .................... 423/213.5; 423/213.7
[51] Int. Cl.² .................... B01D 53/34
[58] Field of Search ........ 423/213.2, 213.5, 213.7, 423/239; 60/300

[56] References Cited

UNITED STATES PATENTS

| | | | |
|---|---|---|---|
| 3,429,656 | 2/1969 | Taylor et al. | 423/213.7 X |
| 3,444,099 | 5/1969 | Taylor et al. | 423/213.5 X |
| 3,773,894 | 11/1973 | Bernstein et al. | 423/213.5 |
| 3,816,594 | 6/1974 | Kobylinski et al. | 423/213.7 |
| 3,825,654 | 7/1974 | Kobylinski et al. | 423/213.7 |

*Primary Examiner*—G. O. Peters
*Attorney, Agent, or Firm*—Oblon, Fisher, Spivak, McClelland & Maier

[57] ABSTRACT

A converter for the purification of exhaust gases from internal combustion engines and the like which comprises a first converting layer of a catalyst of a sintered body structure selected from the group consisting of nickel oxide-copper oxide; manganese oxide-cerium oxide; manganese oxide-lanthanum oxide; manganese oxide-iron oxide; manganese oxide-niobium oxide; manganese oxide-nickel oxide; and either niobium oxide or yttrium oxide or mixtures of both with cobalt oxide; and a second converting layer of a catalyst selected from the group consisting of platinum; platinum-rhodium; platinum-palladium; and nickel oxide, chromium oxide, copper oxide, iron oxide and barium oxide; wherein the converter is constructed so that the exhaust gases pass through said first converting layer and then through said second converting layer. A copper-filled layer consisting of a copper-containing material may be further provided upstream of said first and second converting layers.

16 Claims, 4 Drawing Figures

CONVERTER FOR THE PURIFICATION OF EXHAUST GASES

This is a continuation of application Ser. No. 455,909, filed Mar. 28, 1974 and now abandoned.

BACKGROUND OF THE INVENTION

1. Field of the Invention

The present invention relates to a converter for the efficient conversion of the nitrogen oxides present in the exhaust gases which issue from an internal combustion engine or the like.

2. Description of the Prior Art

Recently, atmospheric pollution has become a problem of increasing public concern. Thus, there has been an increasing demand for solutions to the problem of exhaust gases which cause atmospheric pollution. Of particular concern is the problem of converting nitrogen monoxide and hydrocarbons which are deemed as the cause of photochemical smog to nontoxic substances. Various approaches have been made for solving this problem. Particularly, various techniques have concentrated on the general approach of purifying the exhaust gases from the internal combustion engine of an automobile or the like.

The composition of the exhaust gases from the internal combustion engine, such as from an automobile using gasoline as fuel, varies with the engine running conditions such as idling, acceleration and deceleration. In general, the composition of such exhaust gases consists, in volume percent, of from 11 to 15% carbon dioxide gas, from 11 to 15% steam, from 0.2 to 4% oxygen, from 0.2 to 8% carbon monoxide, from 0.4 to 4% hydrogen, from 0.06 to 0.006% hydrocarbons such as methane, propane and the like, from 0.1 to 0.3% nitrogen oxides (the majority of which is nitrogen monoxide), the balance being nitrogen. Of these components, carbon monoxide, hydrocarbons and nitrogen oxides are considered to be toxic components, and various attempts have been made to convert the gaseous components into nontoxic materials to minimize the amounts of toxic components discharged into the atmosphere.

In catalytic converters, as in the present invention, the conversion of gaseous components is achieved by converting carbon monoxide and hydrocarbons into carbon dioxide and water by oxidation. Further, these converters convert nitrogen oxides to nitrogen and oxygen by reduction, and subsequently use the oxygen obtained to oxidize the carbon monoxide to carbon dioxide.

While catalysts have been developed which are useful for the oxidation of exhaust gas components, no catalysts have been developed which are effective as reduction catalysts for the conversion of nitrogen oxides.

The catalysts which have been useful in the prior art for the conversion of the toxic components present in exhaust gases include palladium, platinum, platinum plus palladium and platinum plus rhodium on suitable carriers such as alumina. These catalysts serve well as oxidation catalysts, but fail to act as catalysts for reduction of nitrogen oxides. In other words, these catalysts decompose the nitrogen oxides by a reductive reaction, but simultaneously convert portions thereof into ammonia, resulting in the failure to totally purify the exhaust gases. In more detail, the ammonia which has been by-produced will be discharged into the atmosphere, or otherwise will be reoxidized to nitrogen monoxide during its passage through the oxidizing catalyst layer for oxidizing carbon monoxide and hydrocarbons, followed by discharge into the atmosphere. Thus, the intended purification of the exhaust gases is not attained because of the presence of ammonia in the gases.

The amount of nitrogen monoxide produced in the exhaust gases of an automobile depends on the operating conditions of the engine. When the air/fuel ratio is increased at the high operating speeds of an engine, an increase in the amount of nitrogen monoxide results. Also, in such cases, an excessive amount of oxygen is contained in the exhaust gases over that amount which is required to completely burn the components which have not been completely burned in the engine. Under these conditions, the oxygen ratio (which will be described in detail hereinafter) ranges from 100 to 200%. Such high level of oxygen is unfavorable for the conversion of nitrogen monoxide to nitrogen and oxygen. Thus, difficulties have been encountered in developing catalysts useful for the conversion of nitrogen monoxide even under these circumstances.

Thus, in the conversion of nitrogen oxides in the exhaust gases, it is preferred that the aforesaid conversion process be conducted in an efficient manner even at high air/fuel ratios, and also that the amount of by-produced ammonia be minimized.

SUMMARY OF THE INVENTION

Accordingly, one object of the present invention is to provide a converter adapted for use in purifying exhaust gases to meet the aforesaid requirements.

Another object of the present invention is to provide a catalyst converter which purifies exhaust gases from internal combustion engines and the like.

Yet another object of the present invention is to provide a catalyst converter which converts nitrogen oxides present in the exhaust gases to nontoxic components.

Still another object of the present invention is to provide a catalyst converter which comprises a first converting layer of a catalyst which exhibits high conversion rates in a highly reductive atmosphere while it exhibits decreased conversion rates in slightly reductive atmospheres, and a second converting layer of a catalyst which exhibits low conversion rates and a great amount of by-produced ammonia in highly reductive atmospheres while it exhibits increased conversion rates and lesser amounts of by-produced ammonia in slightly reductive atmospheres, wherein the exhaust gases are allowed to pass first through the first layer and then through the second layer thereby achieving high NO conversion rates without by-production of ammonia.

Yet another object of the present invention is to provide a catalyst converter which comprises first and second converting layers and a copper-filled layer, wherein the exhaust gases are allowed to pass first through the copper-filled layer and then through the first and second converting layers, thereby achieving high NO conversion rates without the by-production of ammonia.

Briefly, these objects and other objects of the invention is hereinafter will become more readily apparent can be attained by providing a converter for the purification of exhaust gases which comprises, 1. a first converting layer of a catalyst selected from the group consisting of a catalyst of a sintered body structure made up of a particulate mixture of nickel oxide particles and copper oxide particles, a catalyst of a sintered body structure formed from a particulate mixture of one or more oxides selected from cerium oxide particles, lanthanum oxide particles, iron oxide particles, niobium oxide particles and nickel oxide particles with manganese oxide particles, and a catalyst of a sintered body structure formed from a particulate mixture of either niobium oxide particles or yttrium oxide particles or both with cobalt oxide particles; and 2. a second converting layer of a catalyst of platinum, platinum - rhodium, platinum - palladium, or nickel oxide-chromium oxide-copper oxide-iron oxide-barium oxide; wherein the first and second converting layers are so arranged such that the exhaust gases pass through the first converting layer and then through the second converting layer.

BRIEF DESCRIPTION OF THE DRAWINGS

A more complete appreciation of the drawings and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In the converter of the present invention, nitrogen oxides can be converted at a high efficiency over a wide range of oxygen ratios or air/fuel ratios, and particularly the conversion rate at high or low oxygen ratios can be improved which has been a longstanding problem for the conventional catalysts. In addition, the by-production of ammonia as well can be eliminated, so that a high true conversion rate of nitrogen oxides can be attained.

The fact that, with the converter of the present invention, high conversion rates are obtained over a wide range of oxygen ratios, without the by-production of ammonia may be attributable to the following factors. However, it should be noted that the present invention is by no means bound by such theoretical considerations. The catalysts a) to c) of the first catalyst group which form the first converting layer bring about a particularly high conversion rate at low oxygen ratios and only show a gradual decrease in the conversion rate as the oxygen ratio increases. Further, these catalysts do not produce ammonia. The catalysts d) to g) of the second catalyst group which form the second converting layer exhibit low conversion rates and also produce large amounts of ammonia at low oxygen ratios, and as the oxygen ratio increases, they exhibit improved conversion rates and a lower amount of ammonia by-production. This is particularly evident at oxygen ratios of 80 to 100% where the catalysts of the second group show conversion rates higher than those of the first group. It should be noted, however, that in the present invention, the exhaust gases are first brought into contact with one of the catalysts of the first catalyst group in the first converting layer, and then are introduced into the second converting layer where the gas contacts one of the catalysts of the second catalyst group, such that in gases having low oxygen ratios, the conversion, for the most part occurs in the first converting layer without the attendant by-production of ammonia, while the unconverted components in the remaining part of the gases are converted in the second converting layer. In short, when the gases possess low oxygen ratios, the conversion of the gaseous components may be successfully accomplished at greater efficiencies without the attendant by-production of ammonia, as compared with those cases which merely use the catalysts of the second group. On the other hand, when the exhaust gases have high oxygen ratios, neither of the two catalyst groups leads to the by-production of ammonia. In addition, the combination of the first and second converting layers gives conversion rates greater than the maximum conversion rates obtained when the first and second converting layers are used individually.

The most important aspect of the present invention is that the conversion rates obtained are not merely an average of the sum of those rates which would be obtained by the individual use of two types of catalysts selected from the first and second catalyst groups, but rather are a multiple effect of the two kinds of catalysts (refer to the Examples). The multiple effect achieved does not result from the individual action of the catalysts of the first and second catalyst groups, but rather is the result of the fact that a greater portion of the exhaust gases are purified before they are introduced into the second converting layer. This fact receives support from the fact that a mere mixture of the catalysts selected from the first and second catalyst groups fails to result in the improved effects obtained by the present invention.

The catalysts used in the first converting layer are all of a sintered body structure, such that the particles of each constituent are uniformly mixed and form a porous sintered body.

As used in the present invention, the sintered catalyst body consists essentially of a powdered mixture of nickel oxide particles with copper oxide particles. Particles of either or both of the oxides should preferably be present in amounts in excess of 0.5% by weight, although the mixing ratios of the both components is not particularly limited.

When the sintered catalyst bodies consist essentially of a combination of manganese oxide particles with one or more oxide particles of the group of cerium oxide particles, lanthanum oxide particles, iron oxide particles, niobium oxide particles and nickel oxide particles, the manganese oxide particles should preferably be present in the range from 75 to 99.8% by weight. On the other hand, when the sintered catalyst bodies consist essentially of a mixture of one or both of niobium oxide particles and yttrium oxide particles with cobalt oxide particles, the cobalt oxide particles should preferably be present in the range from 65 to 99.8% by weight.

In these catalysts, the nickel oxide, manganese oxide and cobalt oxide do not necessarily have to be stoichiometric compounds, but may be compounds which can be obtained by reducing the oxide particles such as $NiO_{0.8}$, $MnO_{1.4}$, $CoO_{0.7}$, and the like. Particularly, in the case of nickel oxide, the reduced compounds improve the conversion rates to a great extent.

The preparation of the catalysts having a sintered body structure may include the following procedures. In one procedure, a small amount of polyvinylalcohol (PVA) or carboxymethyl cellulose (CMC) is added as a binder to the particles of a starting material which is kneaded. After kneading, the material is shaped into beads, granules, pellets, plates or a honeycomb structure or the like. Alternatively, the oxide particles are placed in a metallic mold and shaped under pressure. Subsequently, the shaped bodies or the particles of the starting material are placed in a container, and then sintered at a high temperature, whereby a catalyst having a porous sintered body structure is obtained.

When oxide particles are used to prepare the catalysts, the particle size of the oxides should preferably range from 3 to 50μ from the viewpoint of catalyst activity. Meanwhile, the ratio in amounts, of starting oxide particles depends on the desired composition of the catalyst. Furthermore, the sintering temperature should be such that the starting oxide particles may be bonded together, and thus generally ranges from 900° C to 1150° C.

Conventional platinum base catalysts can be used as the platinum catalysts in the second converting layer of the converter of the present invention. The procedures for preparing the platinum base catalysts are shown in the Examples. Furthermore, the catalyst consisting of nickel oxide, chromium oxide, copper oxide, iron oxide and barium oxide can be prepared by a known method, wherein the components as the nitrate salts are impregnated into carriers, followed by heating, decomposition and oxidation, which results in a supported catalytically active material. If such a catalyst is used alone in the second converting layers, the production of ammonia during the conversion of the nitrogen oxides will occur and the amount of ammonia by-produced peaks particularly at low oxygen ratios (refer to FIG. 2). To overcome this drawback, the present invention contemplates the use of a converter wherein the exhaust gases are first introduced into the first converting layer and then into the second converting layer using the aforesaid catalysts, whereby efficient conversion of the toxic components in exhaust gases can be accomplished without the attendant by-production of ammonia.

In the second embodiment of the present invention, a converter is provided for purifying exhaust gases, which converter consists of a copper-filled layer consisting essentially of a copper-containing material selected from the group consisting of copper, copper oxide and mixtures thereof, in addition to the previously described first and second converting layers.

The second converter of the present invention is designed so that the exhaust gases first pass through the copper-filled layer and then through the first and second converting layers. The following describes the highly efficient purification of exhaust gases achieved by the use of the second converter containing the additional copper-filled layer, although the present invention is by no means limited to the theoretical considerations which will be described hereinafter.

As has been described, since the conversion of nitrogen oxides (abbreviated as 'NOx' hereinafter) is a reductive reaction, the atmosphere of the exhaust gases which contact the catalyst layers largely affects the conversion rate. The exhaust gas atmospheres which are subjected to the catalytic treatment can be classified as follows:

1. a slightly reductive atmosphere i.e., one in which the state of the exhaust gases is that they contain oxygen in amounts slightly less than that required to completely burn the combustible components such as carbon monoxide and hydrocarbons in the exhaust gases. More specifically, the state of the gases is such that the air/fuel ratios range approximately from 14 to 14.6 or the range is about 50 to 100% in terms of oxygen ratio.

2. an oxidative atmosphere, i.e., the state of the gases in which the air/fuel ratios range over 14.6 or the gases in which the oxygen ratios range over 100%; and 3. a highly reductive atmosphere i.e., the state of the gases in which the air/fuel ratios range less 14 or those gases in which the oxygen ratios range less than 50%.

Since the conversion of the NOx components is a reductive reaction as mentioned above, a decrease in the conversion rate occurs for exhaust gases which are oxidative atmospheres. This is a phenomenon common to the conventional NOx conversion catalysts. On the other hand, although most precious metal base catalysts such as platinum, palladium, rhodium and the like exhibit high conversion rates in the slightly reductive atmospheres, the conversion rates thereof are decreased in highly reductive atmospheres with the attendant by-production of ammonia. Further, the conversion rates thereof in oxidative atmospheres are extremely low (refer to the Examples).

If the copper-filled layer is placed upstream of the first and second converting layers which contain the NOx converting catalysts of the present invention, then the exhaust gases will be reduced or oxidized by the copper or copper oxide present in the copper-filled layer, thereby presenting a slightly reductive atmosphere, which is susceptible to a greater degree of conversion in the first and second converting layers.

The mechanism by which the exhaust gases become slightly reductive is believed to be as follows. When the exhaust gases exhibit an oxidative atmosphere, the copper (Cu) in the copper-filled layer is reacted with oxygen in the gases to give copper oxide (CuO), and as a result the atmosphere becomes close to the slightly reductive atmosphere. On the other hand, when the gases present a highly reductive atmosphere, then oxygen in the aforesaid CuO reacts with the combustible components such as carbon monoxide, hydrocarbons, and the like to thereby produce carbon dioxide and water, with the result that CuO is reduced to Cu. Thus, the gases give a slightly reductive atmosphere. The reaction between Cu and CuO is reversible. With gasoline automobile engines, the atmosphere of the exhaust gases is either oxidative or highly reductive, depending on the running conditions of the engine at high or low speed, respectively. Since such high and low speeds are repeated, the reaction between Cu and CuO is reversed repeatedly. By this mechanism, the exhaust gases are maintained in a slightly reductive atmosphere or close to a slightly reductive atmosphere.

It is clear now that the achievement of a high NOx conversion rate over a wide range of oxygen ratios is attributable to the arrangement of the copper-filled layer upstream of the first and second converting layers adapted to convert NOx and hence the sequential passage of the exhaust gases through the copper-filled layer and then through the first and second converting layers.

As is apparent from the foregoing, the reaction between Cu and CuO is reversible depending on the nature of the exhaust gases. Therefore, the copper-containing materials such as copper, copper oxide or mixtures thereof in the form of Cu or CuO (or $Cu_2O$) may be placed in the copper-filled layer initially. Although the form of the copper-containing material is not critical in so far as it is solid, the sintered body structure is best suited for achieving the maximum contact of the copper with the exhaust gases. Alternatively, the copper-containing material may be used in the form of splinters, beads, granules, chips, plates or screens, or it may be supported on a carrier such as γ-alumina. The copper or copper oxide need not be necessarily pure, but may be used as a combined body with another material, such as in the form of an alloy. In other words, other components may also be present with the copper or copper oxide. The presence of $CeO_2$, $La_2O_3$ or mixtures thereof with copper and/or copper oxide promotes the oxidation and reduction between Cu and CuO, thereby further promoting the effective conversion of NOx materials to nontoxic products.

In preparing a converter according to the present invention, the first and second converting layers are so arranged that the exhaust gases flow through the layers in the indicated sequence. When the copper-filled layer is further provided, the arrangement is such that the copper-filled layer is placed ahead of the first and second converting layers so that the exhaust gases pass through the layers in this sequence. One example of such an arrangement is given in FIG. 4.

Figure 4:
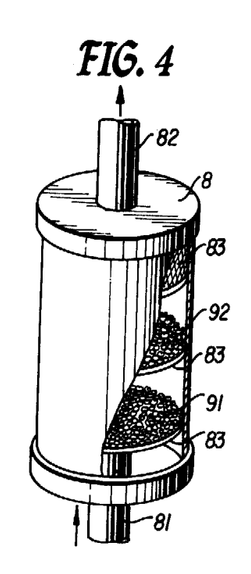
FIG. 4 is a perspective view, partly in cross section, of the converter described in Example 7.

Referring now to FIG. 4, there is shown a cylindrical body which is axially divided into two compartments by screens or porous plates, wherein the catalyst forming the first converting layer is placed in one compartment and the catalyst forming the second converting layer is placed in the other. When the copper-filled layer is used in the system, the cylindrical body is divided into three compartments with each layer being arranged in the sequence described earlier. Alternatively, such layers may be placed in separate containers, respectively, which are connected by means of a pipe in the sequence previously indicated for the passage of the exhaust gases therethrough, thereby forming a converter of the present invention.

The converter of the present invention may be used as a device or apparatus for converting NOx in exhaust gases not only from the internal combustion engine of automobiles or the like, but also from nitric acid plants or the like, and for other similar purposes.

Having generally described this invention, a further understanding can be obtained by reference to certain specific examples which are provided herein for purposes of illustration only and are not intended to be limiting unless otherwise specified.

Figure 3:
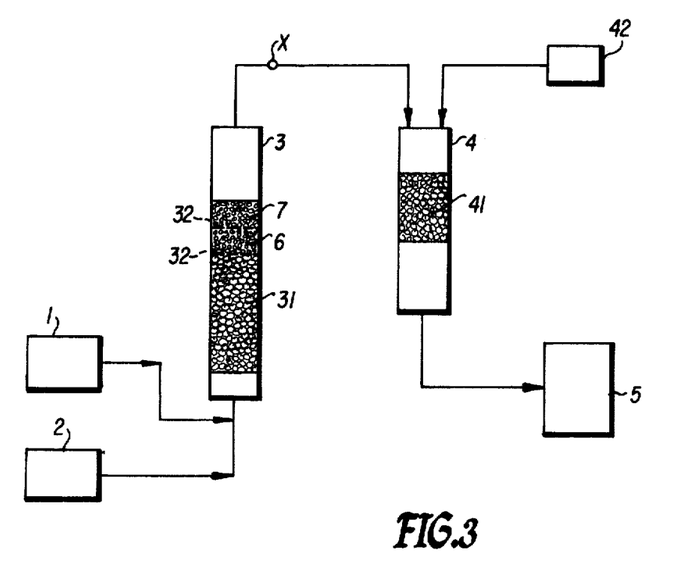
FIG. 3 is a flow sheet which shows the NO-conversion-rate measuring apparatus used in Examples 1 to 6.

The conversion rate measuring method which is commonly used throughout Examples 1 to 6 is as follows:

As shown in the flow sheet of FIG. 3, the conversion-rate measuring apparatus consists of a model gas bomb 1 into which the model gas to be purified is charged, an oxygen bomb 2 which contains oxygen for use in adjusting the amount of oxygen in the system, a converter 3 connected by pipes to bombs 1 and 2, an oxidizing tower 4 connected by a pipe to converter 3, and an analyzer 5 connected by a pipe to the oxidizing tower 4, wherein the analyzer is adapted to measure the concentration of the unconverted nitrogen monoxide. Furthermore, the aforesaid oxidizing tower 4, used in the oxidation reaction is connected to oxygen bomb 42. The converter 3 is a quartz cylinder which has an inner diameter of about 22 mm, within which is placed from bottom to top, a preheating layer 31 consisting of silicon carbide beads, a thin layer 32 of glass fibers, a first converting layer 6 consisting of a catalyst selected from the first catalyst group, a thin layer 32 of glass fibers and a second converting layer 7 consisting of a catalyst selected from the second catalyst group. The oxidizing tower 4 which is filled with Pt-Rh catalyst 41 serves to oxidize the ammonia which has been produced in the converter 3 to nitrogen monoxide with oxygen from the oxygen bomb 42. By arranging the oxidizing tower 4 in the above-indicated manner, it is possible to measure the amount of nitrogen monoxide which has been actually removed by the converter 3, as will be described hereinafter.

For the measurement of the conversion rate, the preheating layer 31, the first and second converting layers 6 and 7 in the converter 3, and the catalyst 41 in the oxidizing tower 4 are heated and maintained at the desired temperatures by means of a heating source (not shown) placed externally thereof. Subsequently, the model gas from the model gas bomb 1 and the oxygen gas from the oxygen gas bomb 2 are mixed and introduced into the converter 3 and the flow rates thereof are adjusted. The gases thus introduced into the converter are heated to a converting temperature in the preheating layer 31, and then are passed into the layers 6 and 7 in which the nitrogen monoxide is converted. The gas from the converter 3 then enters oxidizing tower 4, wherein the by-product ammonia in the gas is completely converted into nitrogen monoxide. The gas from oxidizing tower 4 then enters the analyzer 5, wherein the concentration of the nitrogen monoxide present in the gas is measured. In this respect, the amount of nitrogen monoxide detected at the analyzer 5 is the amount of nitrogen monoxide which has not been converted in the converter 3. Before passing the gas to be analyzed into the analyzer, the gas is confirmed to be free of any non-oxidized ammonia by passing the gas through Nessler's reagent.

The model gas as used herein consists by volume of 800 ppm of nitrogen monoxide (NO), 500 ppm of propane ($C_3H_8$) as the hydrocarbon component, 1% carbon monoxide (CO), 1% hydrogen ($H_2$), 10% water ($H_2O$) and the balance of nitrogen ($N_2$). The composition of the toxic components in the model gas approximates the composition of the toxic components in the exhaust gases which are evolved from the automobile.

The volume (apparent volume) of each catalyst used is shown in each Example. The catalyst temperature during the measurements was 600° C and the space velocity was 12,000/hr. As has been described, the oxygen ratio is varied by varying the amount of oxygen supplied from the oxygen bomb 2. Thus, the relationship of the oxygen ratio to the conversion rate can be measured. The oxygen ratio as used herein is defined in the value (%) obtained from the formula:

$$100 \times [\text{total amount of oxygen (To)/the theoretical amount of oxygen (Th)}]$$

The total amount of oxygen (To) represents the total amount of oxygen in the gas mixture supplied to the converter 3. The theoretical amount of oxygen (Th) denotes the amount of oxygen which is supplied to the model gas to completely oxidize the $C_3H_8$ and CO in the model gas. In addition, the conversion rate as used herein signifies the amount of NO in the gas mixture converted into nontoxic components such as nitrogen, oxygen and the like, i.e., the conversion rate is represented by the value (%) obtained from the formula:

$$100 \times (V_o - V_1)/V_o,$$

wherein $V_o$ represents the amount of NO in the gas mixture and $V_1$ the amount of NO detected in the analyzer 5.

The aforesaid measurements were conducted as the oxygen ratio was increased up to 150%. After the ratio reached 150%, it was decreased.

EXAMPLE 1

A sintered catalyst body consisting of nickel oxide and copper oxide (which hereinafter will be referred to as a NiO-CuO catalyst) was used as the catalyst for the first converting layer, while a catalyst consisting of nickel oxide, chromium oxide, copper oxide, iron oxide and barium oxide supported on a γ-alumina carrier (which hereinafter will be referred to as NiO-Cr$_2$O$_3$, or the like supported catalyst) was used as the catalyst for the second converting layer.

The NiO-CuO catalyst was prepared in the manner described as follows: Particles of nickel monoxide (NiO) were added and mixed with 60 to 95% by weight of copper oxide (CuO) in the ratios shown under the column of catalysts in Table 1, and then 10% of a 1% aqueous polyvinylalcohol (PVA) solution was added and then kneaded with the mixture thus prepared. Thereafter, the material thus kneaded was shaped into minute beads of about 4 mm in diameter with a granulator. Then, the minute beads were dried and sintered at 950° C for 3 hours in an electric resistance furnace in air, while eliminating PVA. The catalyst of the aforesaid sintered body structure exhibited a porosity of about 40%, and the size thereof was about 4 mm in diameter. The starting materials of this catalyst had a 3 to 10μ particle size.

minutes, after which the treated carrier was removed therefrom, and dried at 120° C for about 20 hours. After drying, the impregnated carrier was heated at a rate of 5° C/min. to 600° C and allowed to stand at this temperature for 3 hours in the presence of a stream of air. Thereafter, the carrier was cooled and immersed in the solution (II), and the aforesaid procedures were repeated to obtain the desired catalyst. The catalyst thus prepared contained the following catalyst components consisting of 60% NiO, 14% Cr$_2$O$_3$, 14% CuO, 10% Fe$_2$O$_3$ and 2% BaO supported on the carrier. The amount of catalyst components supported on the carrier was 25% based on the alumina carrier.

Subsequently, a 10 cc quantity of each of the two catalysts was placed in the converter 3 in the indicated manner for the measurements of the NO conversion rates. The results are shown in Table 1.

The term "Catalyst" appearing in Table 1 denotes the composition of the catalyst in each converting layer, while the term "increase" under the column of "Oxygen ratio" denotes the instances where the measurements were taken with increasing oxygen ratios and the term 'decrease' under the same column represents the instance where the measurements were taken at decreasing oxygen ratios. Furthermore, the character "S" denotes the comparative value which shows the conversion rate when the single catalyst is used, while the character D represents the conversion rate obtained in the converter according to the present invention in which the NiO - CuO catalyst was used for the first converting layer, and the NiO-Cr$_2$O$_3$ or the like supported catalyst was used for the second converting layer. Furthermore, the conversion rates are shown as a function of the oxygen ratios.

Figure 1:
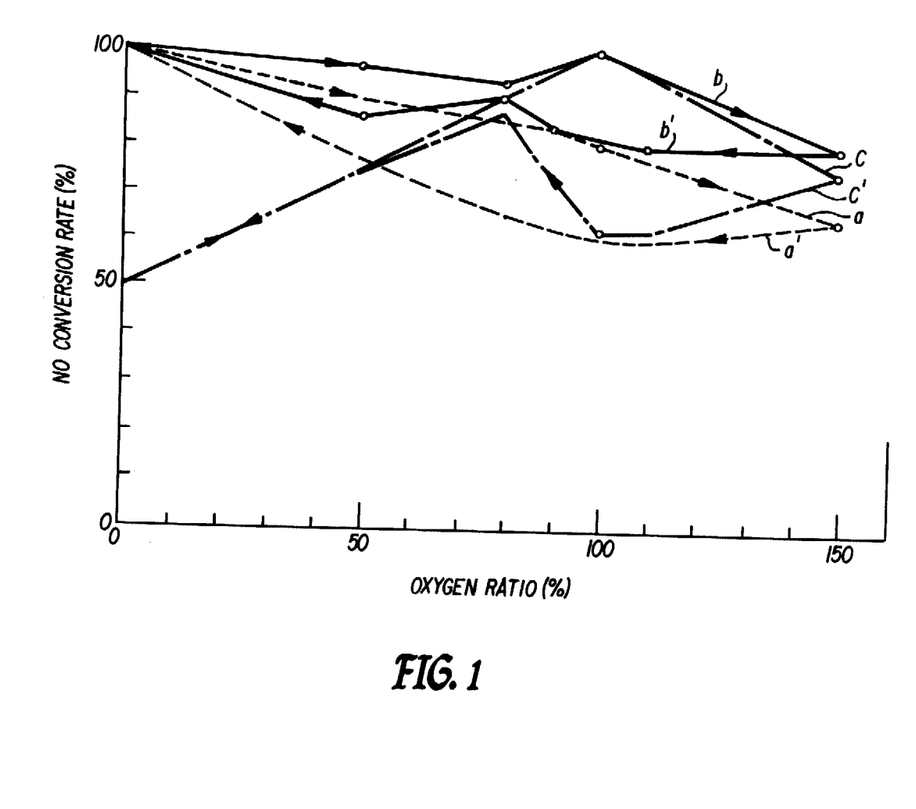
FIG. 1 is a plot showing the conversion rates obtained for the converters of Example 1.

In order to show the trend of the conversion rates in the converters, the conversion rates for converters No. 1 and No. C$_1$ shown in Table 1 are shown in FIG. 1. FIG. 1 is a plot showing oxygen ratio (%) on the abscissa and the NO conversion rate (%) on the ordinate. Each conversion rate is indicated by the same symbol as used in column "FIG. 1 curve symbol".

Table 1

| No. | Catalyst | Oxygen ratio | Catalyst layer | NO conversion ratio (%) Oxygen ratio (%) | | | | | | | Fig. 1 curve symbol |
|---|---|---|---|---|---|---|---|---|---|---|---|
| | | | | 0 | 50 | 80 | 90 | 100 | 110 | 150 | |
| 1 | 5% NiO- | increase | S | 100 | 90 | 85 | 83 | 80 | 77 | 65 | a |
| | | | D | 100 | 96 | 93 | 97 | 100 | 96 | 80 | b |
| | 95% CuO | decrease | S | 100 | 77 | 66 | 63 | 60 | 60 | 65 | a' |
| | | | D | 100 | 86 | 90 | 84 | 80 | 80 | 80 | b' |
| 2 | 20% NiO- | increase | S | 100 | 95 | 90 | 88 | 85 | 82 | 70 | |
| | | | D | 100 | 98 | 95 | 97 | 100 | 98 | 82 | |
| | 80% CuO | decrease | S | 100 | 80 | 74 | 72 | 70 | 70 | 70 | |
| | | | D | 100 | 88 | 92 | 86 | 82 | 82 | 82 | |
| 3 | 40% NiO- | increase | S | 100 | 86 | 80 | 77 | 75 | 71 | 55 | |
| | | | D | 100 | 94 | 91 | 97 | 100 | 94 | 78 | |
| | 60% CuO | decrease | S | 95 | 70 | 62 | 58 | 55 | 55 | 55 | |
| | | | D | 95 | 84 | 88 | 82 | 77 | 78 | 78 | |
| C1 | 60% NiO-<br>14% Cr$_2$O$_3$-<br>14% CuO- | increase | S | 50 | 75 | 91 | 97 | 100 | 95 | 75 | c |
| | 10% Fe$_2$O$_3$-<br>2% BaO | decrease | S | 50 | 75 | 87 | 73 | 62 | 63 | 75 | c' |

The NiO-Cr$_2$O$_3$, or the like supported catalyst was prepared in the following manner. Two kinds of aqueous solutions were prepared using nitrates of nickel, copper, iron and barium, and anhydrous chromic acid. The molar ratios of the solutions were (I) Ni:Cr = 3.5:1.5 and (II) Ni:Cu:Fe:Ba = 2.5:1.5:0. 6:0.1.

Next, a commercially available carrier γ-Al$_2$O$_3$ (grain size about 4 mm) was immersed in solution (I) for 30

As can be seen from Table 1 and FIG. 1, the converters of the D configuration for No. 1 to No. 3 in Table 1 of the present invention exhibit greater conversion rates compared with those converters which only use the catalysts individually ('S' row of data for Nos. 1 to 3 and No. C1 in Table 1). Of most noteworthy significance are the improvements in the conversion rates at high oxygen ratios. For instance, as can be seen from FIG. 1, the individual use of the NiO-Cr$_2$O$_3$ or the like supported catalyst ('S' row for No. C1) only presents a low conversion rate, particularly at a low oxygen ratio. Further, the individual use of the NiO-CuO catalyst ('S' row for No. 1) presents a high conversion rate at a low oxygen ratio, but presents a lower conversion rate at increased oxygen ratios. However, in the converter ('D' row for No. 1) of the present invention in which the 5% NiO - 95% CuO catalyst is used for the first converting layer and the NiO-Cr$_2$O$_3$ or the like supported catalyst is used for the second converting layer, a conversion rate of almost over 90% is obtained at an oxygen ratio of no more than 100%, and a high conversion rate is obtained even at an oxygen ratio of not less than 100%, with the oxygen ratio being increased. Furthermore, the converter still exhibits conversion rates as high as 80% even in those instances when the oxygen ratio is decreased. Thus, it can be seen that the converter of the present invention exhibits good improvements in the conversion rates as a result of such an arrangement. Particularly, it should be noted that a considerable improvement is achieved in the conversion rate in those instances when the oxygen ratio is decreased, and this is also reflected in the other Examples.

As can be seen from the foregoing, lower conversion rates are achieved when the oxygen ratio is decreased, compared to those instances when the oxygen ratio is increased. This can be attributed to the fact that there is a difference in the catalyst activities depending on the nature of the atmospheres to which the catalyst is subjected. However, in the converter of the present invention, the conversion rate is not appreciably lowered even when the oxygen ratio is decreasing, thus maintaining a high conversion rate irrespective of the varying oxygen ratios. This fact is also noted in the other Examples of the present invention.

EXAMPLE 2

In a converter the NiO-CuO catalyst was used for the first converting layer, while the catalyst consisting of platinum and rhodium on a γ-alumina carrier (which hereinafter is referred to as a Pt-Rh catalyst) was used for the second converting layer.

The NiO-CuO catalyst was prepared by mixing NiO particles with 1 to 50% CuO particles in the manner shown in Table 2 and as in the case of the NiO-CuO catalyst of Example 1.

The Pt-Rh catalyst was prepared in the following manner:

γ-Alumina similar to that used in Example 1 was immersed in an alcohol solution containing 0.1 mole/l platinum chloride and 0.1 mole/l rhodium chloride. The treated alumina carrier was dried and heated at 200° C for 0.5 hour in a hydrogen atmosphere, followed by heating at 800° C for 0.5 hour in air. The catalyst obtained consisted of 67% platinum and 33% rhodium supported on the carrier. The amount of catalyst components supported on the carrier was 0.3% based on the γ-alumina carrier.

Subsequently, a 10 cc quantity of each of the catalysts was placed in the converter for the measurement of NO conversion rates. The results are shown in Table 2 in a manner similar to that shown in Table 1. The 'S' rows in Table 2 refer to the individual use of each catalyst while the 'D' rows refer to the converter of the present invention in which the NiO-CuO catalyst is used in the first converting layer and the Pt-Rh catalyst is used in the second converting layer.

Table 2

| No. | Catalyst | Oxygen ratio | Catalyst layer | NO conversion rate (%) Oxygen ratio (%) | | | | | | |
|---|---|---|---|---|---|---|---|---|---|---|
| | | | | 0 | 50 | 80 | 90 | 100 | 110 | 150 |
| 4 | 50% NiO- | increase | S | 100 | 100 | 88 | 82 | 74 | 65 | 35 |
| | | | D | 100 | 100 | 100 | 100 | 100 | 65 | 35 |
| | 50% CuO | decrease | S | 80 | 73 | 62 | 55 | 50 | 43 | 35 |
| | | | D | 85 | 83 | 93 | 96 | 100 | 44 | 35 |
| 5 | 60% NiO- | increase | S | 100 | 100 | 92 | 88 | 82 | 76 | 46 |
| | | | D | 100 | 100 | 100 | 100 | 100 | 76 | 46 |
| | 40% CuO | decrease | S | 100 | 100 | 76 | 68 | 61 | 57 | 46 |
| | | | D | 100 | 100 | 97 | 97 | 100 | 57 | 46 |
| 6 | 90% NiO- | increase | S | 100 | 100 | 94 | 80 | 85 | 80 | 51 |
| | | | D | 100 | 100 | 100 | 100 | 100 | 81 | 50 |
| | 10% CuO | decrease | S | 100 | 100 | 85 | 72 | 64 | 60 | 51 |
| | | | D | 100 | 100 | 99 | 98 | 100 | 60 | 50 |
| 7 | 99% NiO- | increase | S | 100 | 100 | 97 | 95 | 91 | 84 | 55 |
| | | | D | 100 | 100 | 100 | 100 | 100 | 85 | 55 |
| | 1% CuO | decrease | S | 100 | 100 | 80 | 73 | 66 | 63 | 55 |
| | | | D | 100 | 100 | 99 | 98 | 100 | 64 | 55 |
| C2 | 67% Pt- | increase | S | 50 | 80 | 91 | 95 | 100 | 10 | 5 |
| | 33% Rh | decrease | S | 50 | 80 | 91 | 95 | 100 | 10 | 5 |

As can be seen from Table 2, the converters of the present invention exhibit greater conversion rates, compared to those which use the catalysts individually. Particularly, the individual use of NiO-CuO catalyst results in a low conversion rate, as the oxygen ratio decreases. In contrast thereto, the converters of the present invention lead to considerable improvements in the conversion rates in the range of oxygen ratios of up to 100%. It also should be noted that the converters of this Example show little or no by-production of ammonia, as will be referred to hereinafter.

EXAMPLE 3

In order to prepare a converter within the scope of the present invention, a NiO-CuO catalyst was used for the first converting layer, while a catalyst having platinum supported on γ-alumina (which hereinafter is referred to as the Pt catalyst) was used for the second converting layer.

The NiO-CuO catalyst was prepared by mixing 90% NiO particles with 10% CuO particles, following a procedure similar to that used for the NiO-CuO catalyst of Example 1.

The Pt catalyst was prepared by immersing γ-alumina similar to that used in Example 1, in an alcohol solution containing 0.1 mole/l platinum chloride. Thereafter the catalyst was dried, heated in a hydrogen atmosphere and then heated in air as in the case of the Pt-Rh catalyst of Example 2. The amount of platinum supported on the γ-alumina was 0.1% based on the γ-alumina.

A 10 cc quantity of each of the catalysts was placed in the converter for the measurement of the NO conversion rates. The results of the measurements are shown in Table 3 in the same manner as is shown in Table 1. The S rows, of course, refer to the individual use of each catalyst, and the D rows refer to the use of 90% NiO - 10% CuO catalyst in the first converting layer and the use of the Pt catalyst in the second converting layer.

same as that shown in Example 3 was used for the second converting layer to prepare a converter having the structure of those of the present invention.

The manganese oxide base caalyst is a sintered body of a mixture of manganese sesquioxide particles ($Mn_2O_3$) with particles of cerium oxide ($CeO_2$), lanthanum oxide ($La_2O_3$), iron oxide ($Fe_2O_3$). niobium oxide ($Nb_2O_5$) or nickel oxide (NiO). The catalyst components were mixed in various ratios as shown in Table 4, kneaded with PVA in the same manner as in the case with the NiO-CuO catalyst of Example 1, shaped into mnute beads, dried, sintered at 1100° C for 15 hours in air which eliminated PVA. The catalysts thus obtained Table 3

| No. | Catalyst | Oxygen ratio | Catalyst layer | No conversion rate (%) Oxygen ratio (%) | | | | | | |
|---|---|---|---|---|---|---|---|---|---|---|
| | | | | 0 | 50 | 80 | 90 | 100 | 110 | 150 |
| 8 | 90% NiO- | increase | S | 100 | 100 | 94 | 90 | 85 | 80 | 51 |
| | | | D | 100 | 100 | 92 | 95 | 98 | 80 | 51 |
| | 10% CuO | decrease | S | 100 | 100 | 85 | 72 | 64 | 60 | 51 |
| | | | D | 100 | 100 | 90 | 95 | 98 | 80 | 51 |
| C3 | PT | increase | S | 20 | 40 | 80 | 95 | 98 | 5 | 5 |
| | | decrease | S | 20 | 40 | 80 | 95 | 98 | 5 | 5 |

As can be seen from Table 3, the provision of the Pt catalyst layer down-stream of the NiO-CuO catalyst layer brings about a high conversion rate.

EXAMPLE 4

A sintered powder catalyst body consisting of a mixture of manganese oxide with cerium oxide, lanthanum oxide or the like (which hereinafter is referred to as a manganese oxide base catalyst) was used for the first converting layer, while the Pt catalyst which was the had a porosity of about 40% and a grain diameter of about 4 mm. The grain diameter of the respective starting particles ranged from about 3 to 10μ.

A 10 cc quantity of each of the manganese oxide based and Pt catalysts was placed in a converter for the measurement of NO conversion rates. The results are shown in Table 4 in the same manner as in Table 1. The D rows in Table 4 refer to converters of the present invention which have the manganese oxide based catalyst in the first converting layer and the Pt catalyst in the second converting layer.

Table 4

| No. | Catalyst | Oxygen ratio | Catalyst layer | NO conversion rate (%) Oxygen ratio (%) | | | | | | |
|---|---|---|---|---|---|---|---|---|---|---|
| | | | | 0 | 50 | 80 | 90 | 100 | 110 | 150 |
| 9 | 95% $Mn_2O_3$- | increase | S | 97 | 97 | 95 | 70 | 45 | 10 | 5 |
| | | | D | 97 | 95 | 95 | 97 | 98 | 10 | 5 |
| | 5% $CeO_2$ | decrease | S | 97 | 97 | 88 | 60 | 20 | 10 | 5 |
| | | | D | 97 | 94 | 93 | 98 | 98 | 10 | 5 |
| 10 | 85% $Mn_2O_3$- | increase | S | 97 | 97 | 90 | 65 | 40 | 8 | 5 |
| | | | D | 97 | 95 | 95 | 96 | 98 | 8 | 5 |
| | 15% $CeO_2$ | decrease | S | 97 | 97 | 80 | 50 | 20 | 5 | 5 |
| | | | D | 97 | 97 | 90 | 93 | 98 | 5 | 5 |
| 11 | 99.7% $Mn_2O_3$- | increase | S | 95 | 95 | 95 | 70 | 45 | 10 | 5 |
| | | | D | 97 | 97 | 95 | 97 | 98 | 10 | 5 |
| | 0.3% $La_2O_3$ | decrease | S | 95 | 95 | 90 | 50 | 20 | 5 | 5 |
| | | | D | 97 | 94 | 93 | 98 | 98 | 10 | 5 |
| 12 | 85% $Mn_2O_3$- | increase | S | 97 | 97 | 90 | 63 | 40 | 8 | 5 |
| | | | D | 97 | 97 | 93 | 94 | 98 | 8 | 5 |
| | 15% $La_2O_3$ | decrease | S | 97 | 95 | 80 | 40 | 20 | 5 | 5 |
| | | | D | 97 | 97 | 90 | 90 | 98 | 5 | 5 |
| 13 | 99.7% $Mn_2O_3$- | increase | S | 95 | 95 | 95 | 68 | 45 | 10 | 5 |
| | | | D | 97 | 97 | 95 | 97 | 98 | 10 | 5 |
| | 0.3% $Fe_2O_3$ | decrease | S | 95 | 95 | 90 | 50 | 15 | 8 | 5 |
| | | | D | 97 | 94 | 93 | 98 | 98 | 10 | 5 |
| 14 | 85% $Mn_2O_3$- | increase | S | 97 | 97 | 90 | 65 | 45 | 8 | 5 |
| | | | D | 97 | 97 | 93 | 96 | 98 | 8 | 5 |
| | 15% $Fe_2O_3$ | decrease | S | 97 | 95 | 80 | 40 | 20 | 5 | 5 |
| | | | D | 97 | 96 | 90 | 90 | 98 | 5 | 5 |
| 15 | 99.7% $Mn_2O_3$- | increase | S | 95 | 95 | 95 | 70 | 40 | 10 | 5 |
| | | | D | 97 | 97 | 95 | 97 | 98 | 10 | 5 |
| | 0.3% $Nb_2O_5$ | decrease | S | 95 | 95 | 90 | 50 | 20 | 5 | 5 |
| | | | D | 97 | 95 | 93 | 97 | 98 | 10 | 5 |
| 16 | 85% $Mn_2O_3$- | increase | S | 95 | 95 | 90 | 60 | 40 | 8 | 5 |
| | | | D | 95 | 95 | 93 | 96 | 98 | 8 | 5 |
| | 15% $Nb_2O_5$ | decrease | S | 95 | 90 | 85 | 40 | 15 | 5 | 5 |
| | | | D | 95 | 95 | 90 | 90 | 98 | 5 | 5 |
| 17 | 99.7% $Mn_2O_3$- | increase | S | 95 | 95 | 95 | 70 | 40 | 10 | 5 |
| | | | D | 95 | 95 | 95 | 97 | 98 | 10 | 5 |
| | 0.3% NiO | decrease | S | 93 | 90 | 90 | 50 | 20 | 5 | 5 |
| | | | D | 95 | 95 | 92 | 92 | 98 | 5 | 5 |
| 18 | 85% $Mn_2O_3$- | increase | S | 95 | 95 | 85 | 60 | 40 | 5 | 5 |
| | | | D | 97 | 97 | 95 | 98 | 98 | 5 | 5 |

Table 4-continued

| No. | Catalyst | Oxygen ratio | Catalyst layer | NO conversion rate (%) Oxygen ratio (%) | | | | | | |
|---|---|---|---|---|---|---|---|---|---|---|
| | | | | 0 | 50 | 80 | 90 | 100 | 110 | 150 |
| | 15% NiO | decrease | S | 95 | 93 | 80 | 40 | 15 | 5 | 5 |
| | | | D | 97 | 95 | 85 | 93 | 98 | 5 | 5 |
| C3 | Pt | increase | S | 20 | 40 | 80 | 95 | 98 | 5 | 5 |
| | | decrease | S | 20 | 40 | 80 | 95 | 98 | 5 | 5 |

As can be seen from Table 4, the use of the Pt catalyst layer down-stream of the manganese based catalyst layer yields a converter which exhibits a high conversion rate.

EXAMPLE 5

In the preparation of another converter within the scope of the present invention, a sintered catalyst body consisting of a mixture of cobalt oxide particles (CoO) with particles of yttrium oxide ($Y_2O_3$) or niobium oxide ($Nb_2O_5$) (which hereinafter is referred to as a cobalt oxide base catalyst) was used in the first converting layer, while a catalyst of platinum and palladium on γ-alumina (which hereinafter is referred to as Pt-Pd catalyst) was used in the second converting layer.

The cobalt oxide based catayst was prepared by mixing $Y_2O_3$ particles or $Nb_2O_5$ particles with CoO particles, and the mixture thus obtained was kneaded with PVA as in the case of the NiO-CuO catalyst of Example 1. The kneaded mixture was shaped into minute beads, dried and heated at 1100° C for 15 hours. The catalyst thus prepared exhibited a porosity of about 35% and a grain diameter of about 4 mm. The starting particles of the catalyst had a grain size of about 5 to 10μ.

The Pt-Pd catalyst was prepared by immersing a γ-alumina carrier similar to that used in Example 1 into an alcohol solution containing 0.1 mole/l platinum chloride and 0.1 mole/l palladium chloride. The treated carrier was dried in the same manner as the Pt-Rh catalyst of Example 2, heated at 400° C for 0.5 hour (in a hydrogen atmosphere), followed by heating at 800° C for 0.5 hour in air. The Pt-Rh catalyst obtained consisted of 67% platinum and 33% palladium supported on the carrier. The amount of the catalyst components supported on the γ-alumina was 0.3% based on the amount of γ-alumina.

A 10 cc quantity of each of the cobalt oxide based catalyst and the Pt-Pd catalyst was placed in the converter in the manner already indicated for the measurement of the NO conversion rates. The results are shown in Table 5 in the same manner as in Table 1. The D rows in Table 5 refer to converter configurations which have the cobalt oxide based catalyst in the first converting layer and the Pt-Pd catalyst in the second converting layer.

Table 5

| No. | Catalyst | Oxygen ratio | Catalyst layer | NO conversion rate (%) Oxygen ratio (%) | | | | | | |
|---|---|---|---|---|---|---|---|---|---|---|
| | | | | 0 | 50 | 80 | 90 | 100 | 110 | 150 |
| 19 | 99% CoO | increase | S | 95 | 95 | 90 | 90 | 90 | 80 | 40 |
| | | | D | 95 | 97 | 95 | 97 | 98 | 80 | 40 |
| | 1% $Y_2O_3$ | decrease | S | 93 | 90 | 85 | 80 | 45 | 40 | 40 |
| | | | D | 95 | 95 | 90 | 97 | 98 | 40 | 40 |
| 20 | 80% CoO- | increase | S | 97 | 95 | 85 | 80 | 80 | 70 | 40 |
| | | | D | 96 | 95 | 90 | 97 | 98 | 70 | 40 |
| | 20% $Y_2O_3$ | decrease | S | 95 | 90 | 80 | 65 | 50 | 40 | 40 |
| | | | D | 95 | 95 | 83 | 94 | 98 | 40 | 40 |
| 21 | 99% CoO- | increase | S | 95 | 95 | 90 | 90 | 90 | 80 | 40 |
| | | | D | 95 | 95 | 97 | 97 | 98 | 80 | 40 |
| | 1% $Nb_2O_5$ | decrease | S | 95 | 90 | 85 | 80 | 50 | 40 | 40 |
| | | | D | 95 | 95 | 86 | 96 | 98 | 40 | 40 |
| 22 | 90% CoO- | increase | S | 95 | 95 | 90 | 85 | 80 | 70 | 40 |
| | | | D | 95 | 95 | 97 | 97 | 98 | 70 | 40 |
| | 10% $Nb_2O_5$ | decrease | S | 95 | 90 | 80 | 65 | 60 | 40 | 40 |
| | | | D | 95 | 95 | 83 | 94 | 98 | 40 | 40 |
| C4 | 67% Pt- | increase | S | 40 | 60 | 80 | 93 | 95 | 5 | 5 |
| | 33% Pd | decrease | S | 40 | 60 | 80 | 93 | 95 | 5 | 5 |

As is clear from the data of Table 5, the converters of the present invention exhibit high conversion rates.

EXAMPLE 6

A copper-filled layer was placed upstream of the first and second converting layers of the converter shown in Examples 1 and 2 to prepare another converter within the scope of the present invention. In other words, the catalyst beds of the converter were placed from bottom to top in an order such that a gas passed sequentially through a copper-filled layer, the first converting layer of the NiO-CuO catalyst and the second converting layer of the NiO-$Cr_2O_3$ or the like supported catalyst or the Pt-Rh catalyst. A 99% NiO-1% CuO catalyst and a 67% Pt-33% Rh catalyst as shown in Example 2 were used as the NiO-CuO catalyst and Pt-Rh catalyst, respectively. In addition, a 60% NiO-14% $Cr_2O_3$-14% CuO-10% $Fe_2O_3$-2% BaO catalyst as shown in Example 1 was used as the NiO-$Cr_2O_3$ or the like supported catalyst.

In preparing the copper-filled layer, a powdered mixture consisting of 50% copper oxide (CuO) and 50% copper was kneaded with PVA in the same manner as described in the case of the NiO-CuO catalyst of Example 1 to form minute beads of the catalyst. The beads thus prepared were sintered at 850° C for 3 hours in a nitrogen atmosphere. The sintered catalyst material obtained had about a 40% porosity and a grain diameter of about 4mm.

A 10 cc quantity of each of the catalysts and the sintered copper containing material was placed in the converter for the measurement of NO conversion rates. The results are shown in Table 6 in the same manner as in Table 1. The values shown in the T rows for the catalyst layers of No. 23 and No. 24 converters in Table 6 refer to the converters of the present invention, while the D rows refer to the comparative values obtained in the cases where the copper-filler layer (Cu-CuO) was not used. In addition, No. $C_5$ and No. $C_6$ show for comparison purposes the values obtained when the NiO-CuO catalyst is missing from the converters.

Table 6

| No. | Converter | Oxygen ratio | Catalyst layer | NO conversion rate (%) Oxygen ratio (%) | | | | | | |
|---|---|---|---|---|---|---|---|---|---|---|
| | | | | 0 | 50 | 80 | 90 | 100 | 110 | 150 |
| 23 | Cu—CuO⟶ | increase | D | 100 | 96 | 93 | 97 | 100 | 96 | 80 |
| | NiO—CuO⟶ | | T | 100 | 98 | 95 | 97 | 100 | 100 | 85 |
| | NiO—Cr$_2$O$_3$ | decrease | D | 100 | 86 | 90 | 84 | 80 | 80 | 80 |
| | | | T | 100 | 98 | 92 | 87 | 85 | 85 | 85 |
| C5 | Cu—CuO⟶ | increase | D | 60 | 82 | 93 | 97 | 100 | 97 | 82 |
| | NiO—Cr$_2$O$_3$ (or the like) | decrease | D | 60 | 80 | 95 | 97 | 90 | 88 | 82 |
| 24 | Cu—CuO⟶ | increase | D | 100 | 100 | 100 | 100 | 100 | 85 | 55 |
| | Ni—CuO⟶ | | T | 100 | 100 | 100 | 100 | 100 | 98 | 80 |
| | Pt-Rh | decrease | D | 100 | 100 | 99 | 98 | 100 | 64 | 55 |
| | | | T | 100 | 97 | 98 | 100 | 85 | 84 | 80 |
| C6 | Cu—CuO⟶ | increase | D | 60 | 85 | 95 | 98 | 100 | 97 | 30 |
| | Pt—Rh | decrease | D | 60 | 85 | 95 | 98 | 100 | 30 | 30 |

As can be appreciated from the data of Table 6, the additional provision of the copper-filled layer upstream of the first and second converting layers results in higher conversion rates. It should be noted that the mere use of the first and second converting layers maintains substantially 100% conversion rates at oxygen ratios of up to 100% as the oxygen ratio is increased, while exhibiting gradually decreasing conversion rates at oxygen ratios of greater than 100%. On the other hand, the converters which contain a copper-filled layer in the indicated position exhibit high conversion rates even at oxygen ratios of greater than 100%. In addition, as can be seen from the comparative values shown at $C_5$ and $C_6$, the combination of the copper-filled layer with only the second converting layer leads to low conversion rates at lower oxygen ratios.

EXAMPLE 7

The NiO-CuO catalyst was used in the first converting layer and the Pt-Rh catalyst was used in the second converting layer for the preparation of a converter having the configuration shown in FIG. 4, for the measurement of NO conversion rates of the exhaust gases from an automobile using gasoline as the fuel. A 90% NiO-10% CuO catalyst as shown in Example 2 was used as the NiO-CuO catalyst and a 67% Pt-33% Rh catalyst as shown in Example 2 was used as the Pt-Rh catalyst. Each of the catalysts was prepared in 1 liter quantities. Then, the catalysts were placed in a stainless steel cylindrical converter 8 having a diameter of 15 cm, sequentially from bottom to top as NiO-CuO catalyst 91 and Pt-Rh catalyst 92. More particularly, the catalysts 91 and 92 were placed on partitions 83 made of stainless steel screens which divided the interior of the converter 8 into chambers, while the catalysts were separated by partitions 83 from each other.

The exhaust gases were introduced from a lower nozzle 81 into the converter 8, then through each layer and out through the upper nozzle 82. The converter having this configuration was placed in the exhaust gas system of an automobile for measurement of NO conversion rates. The engine used was a reciprocating, four cylinder engine with a total displacement of 1600 cc. The engine was operated and the air/fuel ratio was varied over the range from 14 to 15. The NO conversion rates were measured according to the procedures used in the previous Examples.

The results revealed that the average amount of NO present in the exhaust gases was 1000 ppm prior to the passage through the converter, while the amount of NO was about 150 ppm after the passage therethrough, thus achieving NO conversion rates as high as 85%. The by-production of ammonia was not noted.

The converters as shown in the previous Examples result in little or no by-production of ammonia at the time of the exhaust gas purification. In other words, consistent with the measurements, the measurements for the concentration of NO were taken immediately downstream of the converter 3 as shown by point X in FIG. 3. Thus, the amounts of ammonia by-produced were measured based on the concentrations of NO measured at three points, i.e., at the inlet of the converter 3 and at the outlet of the oxidizing tower 4 (following the same procedures as given in the previous Examples) plus at point X. More particularly, if the NO concentration at Point X is used as $V_1$ in the aforesaid NO conversion rate calculating formula, then the amount of NO decomposed due to the catalysts in the converter 3 may be obtained which amount will be referred to as the apparent NO conversion rate. This apparent conversion rate is the sum of the decomposition rate of NO converted to $NH_3$ and the conversion rate (true conversion rate) of NO which is decomposed into nontoxic components such as $N_2$ and $O_2$. The aforesaid NO conversion rate calculated from NO concentration measured at the outlet of the oxidizing tower 4 represents the amount of NO which has been completely converted or the true conversion rate. This is because the by-produced ammonia is again oxidized in the oxidizing tower. Accordingly, the apparent NO conversion rate less the true conversion rate gives the amount of ammonia by-produced, i.e., the conversion rate (%) of NO to ammonia. The results of such measurements revealed that each converter of the present invention exhibited no ammonia by-production. The following is an example for reference.

EXAMPLE FOR REFERENCE

The 90% NiO-10% CuO catalyst shown in Example 2 was used for the first converting layer, while the 67% Pt-33% Rh catalyst was used for the second converting layer in the preparation of the converter. Then, the by-production rate of the ammonia was measured in the converter. In other words, when the conversion rates were measured as shown in row D for No. 6 of Example 2, the apparent NO conversion rates were measured. The results are shown in Table 7, with the true NO conversion rates at increasing oxygen ratios. Also in Table 7, there are shown the true conversion rates and apparent conversion rates in the instances where the catalysts of No. 25 were used individually (C7 and C8).

Figure 2:
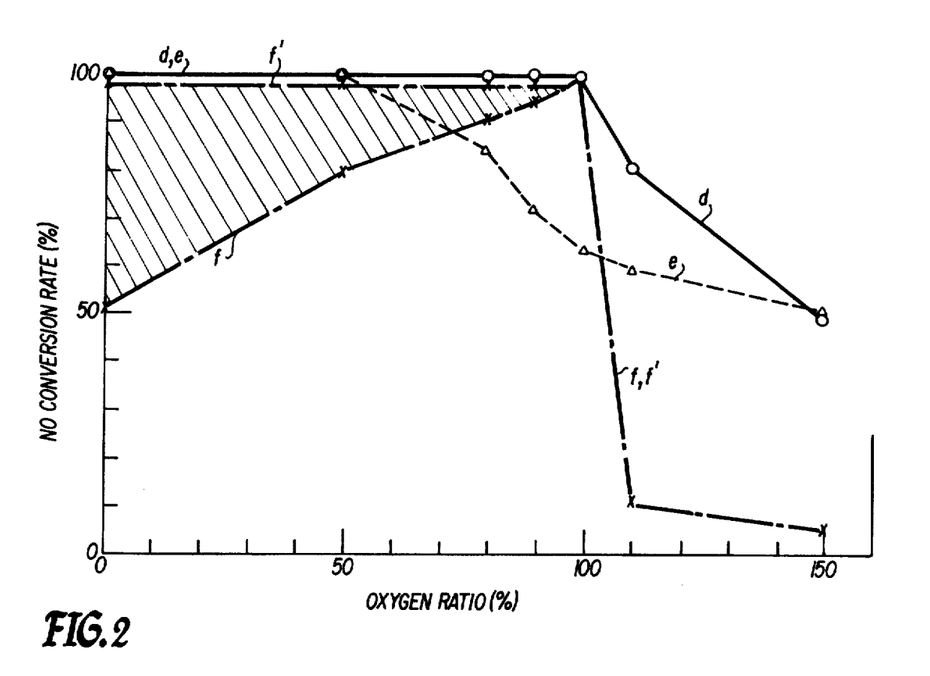
FIG. 2 is a plot showing the true NO conversion rates versus the apparent conversion rates for the converter described in the "Example for Reference"

The tendencies of the true conversion rates and the apparent conversion rates are indicated in FIG. 2 in the same manner as in FIG. 1. (The symbols used correspond to those shown in Table 7.)

Table 7

| No. | Converter | | | NO conversion rate (%) Oxygen ratio (%) | | | | | | | Fig. 2 curve symbol |
|-----|-----------|---|---|---|---|---|---|---|---|---|---|
| | | | | 0 | 50 | 80 | 90 | 100 | 110 | 150 | |
| 25 | NiO—CuO → Pt—Rh | | true | 100 | 100 | 100 | 100 | 100 | 81 | 50 | d |
| | | | apparent | 100 | 100 | 100 | 100 | 100 | 81 | 50 | |
| C7 | NiO—CuO | | true | 100 | 100 | 85 | 72 | 64 | 60 | 51 | e |
| | | | apparent | 100 | 100 | 85 | 72 | 64 | 60 | 51 | |
| C8 | Pt—Rh | | true | 50 | 80 | 91 | 95 | 100 | 10 | 5 | f |
| | | | apparent | 98 | 98 | 98 | 98 | 100 | 10 | 5 | f' |

As is clear from Table 7 and FIG. 2, the converter (No. 25) of the present invention exhibits no differences between the true conversion rate and the apparent conversion rate with the attendant absence of the by-production of ammonia. Furthermore, the NiO-CuO catalyst also results in no by-production of ammonia. In contrast thereto, considerable by-production of ammonia (hatched line portion of FIG. 2) is shown at low oxygen ratios for the Pt-Rh catalyst. The second converting layers shown in the previous Examples all exhibit the tendency to produce ammonia similar to the aforesaid Pt-Rh catalyst.

In this application, the term "conversion rate" means the true NO conversion rate unless otherwise specified.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method of reducing $NO_x$ in exhaust gases over a wide range of oxygen ratios while minimizing ammonia formation, which comprises:
    1. passing said exhaust gas through a first layer of catalyst having a sintered body structure; said catalyst having a high conversion rate at low oxygen ratios, exhibiting a decrease in conversion rate as the oxygen ratio increases, the causing minimal formation of ammonia; and said catalyst being selected from the group consisting of:
       a. a particulate mixture of nickel oxide and copper oxide;
       b. a particulate mixture of manganese oxide and an oxide selected from the group consisting of cerium oxide, lanthanum oxide, iron oxide, niobium oxide, nickel oxide and mixtures thereof; and
       c. a particulate mixture of cobalt oxide and an oxide selected from the group consisting of yttrium oxide, niobium oxide and mixtures thereof; and
    2. thereafter passing said exhaust gas through a second layer of catalyst; said catalyst having a low conversion rate and producing large amounts of ammonia at low oxygen ratios, and exhibiting higher conversion rates while producing lesser amounts of ammonia as the oxygen ratio increases; and said catalyst being selected from the group consisting of:
       d. a platinum-rhodium catalyst;
       e. a platinum catalyst;
       f. a platinum-palladium catalyst; and
       g. a nickel oxide-chromium oxide-copper oxide-iron oxide-barium oxide catalyst.

2. The process of claim 1, which further comprises: passing said exhaust gas through a copper-filled layer consisting essentially of a copper containing material selected from the group consisting of copper, copper oxide and mixtures thereof prior to passage through said first and second converting layers.

3. The process of claim 1, wherein said catalyst of a sintered body structure of the first converting layer is in the shape of beads, granules, pellets, plates or a honeycomb.

4. The process of claim 1, wherein the diameter of said oxide particles of the catalyst of the first converting layer ranges from 3 to 5μ.

5. The process of claim 1, wherein said catalyst of the second converting layer is supported on a carrier.

6. The process of claim 2, wherein said copper-containing material is of a sintered body structure.

7. The process of claim 2, wherein said copper-containing material is in the shape of splinters, beads, granules, chips, plates or a screen.

8. The process of claim 2, wherein said copper-containing material is supported on a carrier.

9. The process of claim 2, wherein said copper-containing material is admixed with a material selected from the group consisting of cerium oxide, lanthanum oxide and mixtures thereof.

10. The process of claim 1, wherein said first converting layer consists of a catalyst of sintered nickel oxide-copper oxide beads.

11. The process of claim 10, wherein said second converting layer consists of nickel oxide-chromium oxide-copper oxide-iron oxide-barium oxide catalyst supported on a carrier.

12. The process of claim 10, wherein said second converting layer consists of a platinum-rhodium catalyst.

13. The process of claim 10, wherein said second converting layer consists of a platinum catalyst.

14. The process of claim 1, wherein said first converting layer consists of a catalyst of sintered beads of manganese oxide with one material selected from the group consisting of cerium oxide, lanthanum oxide, iron oxide, niobium oxide and nickel oxide, and said second converting laayer consists of a platinum catalyst supported on a carrier.

15. The process of claim 1, wherein said converting layer consists of a catalyst of sintered beads of cobalt oxide with one material selected from the group consisting or yttrium oxide and niobium oxide, and said second converting layer consists of a platinum-palladium catalyst supported on a carrier.

16. The process of claim 2, wherein said copper-filled layer consists of sintered copper-copper oxide beads, said first converting layer consists of a sintered nickel oxide-copper oxide catalyst and said second converting layer consists of either a nickel oxide-chromium oxide-copper oxide-iron oxide-barium oxide catalyst or a platinum-rhodium catalyst supported on a carrier.

* * * * *

UNITED STATES PATENT AND TRADEMARK OFFICE
CERTIFICATE OF CORRECTION

PATENT NO. : 4,003,976
DATED : January 18, 1977
INVENTOR(S) : Noboru Komatsu et al It is certified that error appears in the above-identified patent and that said Letters Patent are hereby corrected as shown below:

Column 19, line 61, before "causing" change "the" to --and--;

Column 21, line 6, change "laayer" to --layer--;

Column 21, line 8, before "converting" insert --first--.

Signed and Sealed this

Twenty-first Day of November 1978

[SEAL]

Attest:

RUTH C. MASON
Attesting Officer

DONALD W. BANNER
Commissioner of Patents and Trademarks